No. 682,046. Patented Sept. 3, 1901.
W. E. DELEHANTY.
CONNECTION FOR PIPES.
(Application filed Dec. 7, 1900.)
(No Model.)
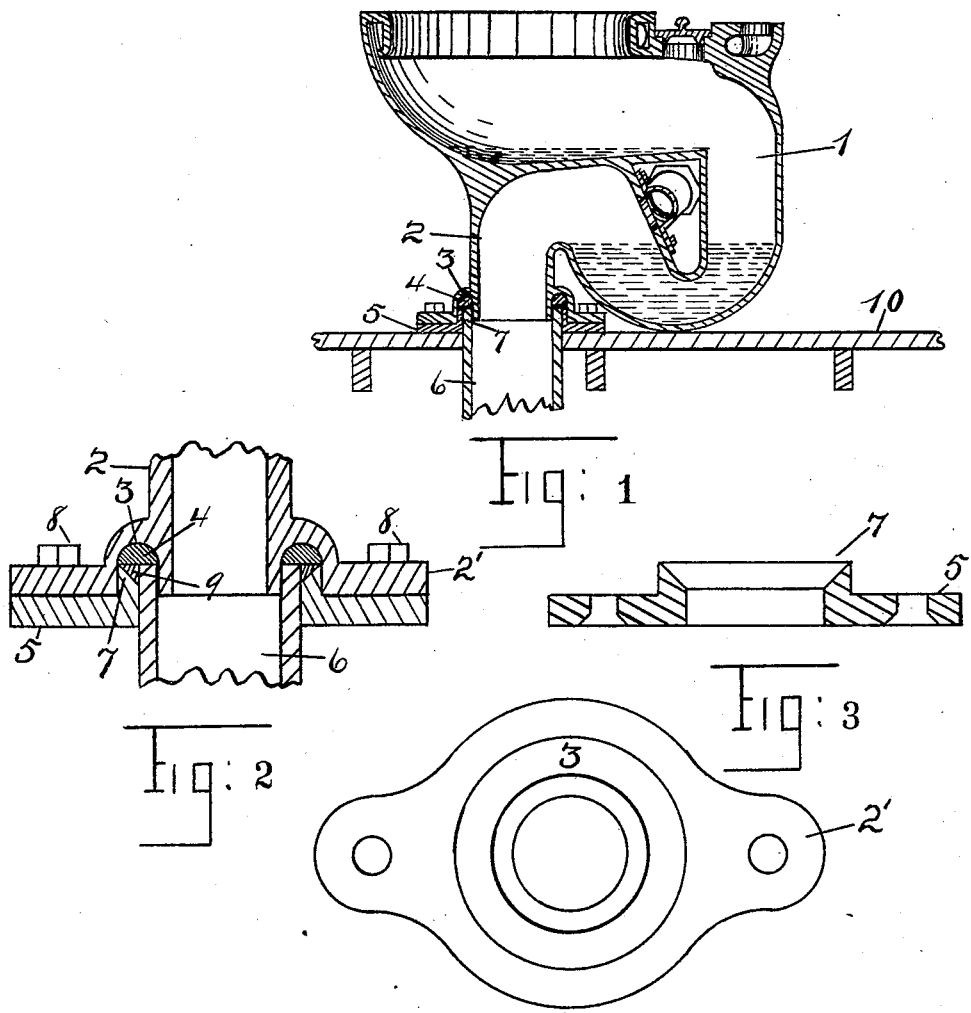
Witnesses:
H. M. Brown
James M. Brown
Inventor:
William E. Delehanty
By H. M. Brown
his Atty.

UNITED STATES PATENT OFFICE.

WILLIAM E. DELEHANTY, OF TROY, NEW YORK.

CONNECTION FOR PIPES.

SPECIFICATION forming part of Letters Patent No. 682,046, dated September 3, 1901.

Application filed December 7, 1900. Serial No. 39,040. (No model.)

*To all whom it may concern:*

Be it known that I, WILLIAM E. DELEHANTY, a citizen of the United States, residing at Troy, New York, have invented certain new and useful Improvements in Connections for Pipes; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

The object of my invention is to provide a new and improved connection for water-closets, pipes, and tubes.

In the drawings, Figure 1 shows a vertical sectional view of a closet connected with the soil-pipe by my device; Fig. 2, a similar view of a portion of the discharge-pipe of a closet, the soil-pipe, and my device shown enlarged, so as to be clearly seen; Fig. 3, a longitudinal sectional view of the floor-plate of my device, and Fig. 4 a plan view of the bottom end of the discharge-pipe of the closet.

1 shows the water-closet, and 2 the discharge-pipe thereof.

3 shows the lower end of the discharge-pipe enlarged and having a groove in its lower end and a flange 2', the groove 3 having a gasket 4, preferably of rubber and of sufficient capacity to receive the end of the soil-pipe 6 and also the tubular projection 7 on the floor-plate 5, the soil-pipe 6 being preferably soldered in the tubular projection 7 by solder 9, preferably run into a depression formed, preferably, by beveling the inner edge of the tubular projection 7. 8 shows the nuts connected with bolts whereby the flange 2' and the flange on the plate 5 are drawn together, compressing the gasket 4 in the groove 3. This manner of connecting the pipes forms a packed connection, easily put in operation and as easily unjointed when desired, for the reason that the meeting surfaces of the groove and of the tubular projection 7 are smooth and devoid of screw-threading or other roughness in order that when the closet is set down over the end of the soil-pipe 6 the parts will slip together and allow of adjusting the parts without trouble from threading or other obstruction to perfect freedom in their movements.

The floor-plate 5 without the soil-pipe 6 goes with the closet as a part of it, and when the closet is to be set up for use the soil-pipe is run up through the floor 10 and the plate 5 set in position and soldered, as seen at 9. The discharge-pipe 2 is then set down upon the flange 5, projection 7, and soil-pipe 6 entering the groove 3 and abutting on the gasket 4, when the nuts 8 are turned home, compressing the gasket, and as the inner portion of the end of the discharge-pipe 2 rests in the mouth of the soil-pipe 6 there is no obstruction presented in the soil-pipe and a very tight joint is formed, and as the soil-pipe and projection on plate 5 rest in the groove 3 the closet is steadied and held more securely than it otherwise would be, and much of the strain is taken off the holding-down nuts 8 and the bolts to which they are attached. My invention may be used with equally good results in connecting water or steam pipes when provided with the necessary means to bolt or screw them together.

Having described my invention, what I claim is—

In a coupling for connecting a closet-bowl to a soil-pipe, the combination with a floor-plate surrounding the soil-pipe and having an upwardly-projecting flange, of a closet-bowl provided with a base-plate overlying the floor-plate and having a downwardly-projecting tubular spud entering the upper end of the soil-pipe and surrounded by a packing-groove, suitable packing within said groove against which the said flange bears, and means for drawing the said parts together, the upper edge of the flange being at least as high as the upper edge of the soil-pipe, whereby the packing is brought into direct contact with said upper edge of the flange to form a sensitive seal thereat, substantially as described.

In testimony whereof I affix my signature in presence of two witnesses.

WILLIAM E. DELEHANTY.

Witnesses:
W. M. BROWN,
JAMES M. BROWN.